United States Patent [19]

Fuyama et al.

[11] Patent Number: 4,843,547
[45] Date of Patent: Jun. 27, 1989

[54] CASH REGISTER WITH A MULTI-WINDOW DISPLAY

[75] Inventors: Seiji Fuyama; Tokio Mori; Mitsuhiro Kodama; Takashi Minato; Yasuhiro Takaoka, all of Yokohama, Japan

[73] Assignee: Matsushita Electric Industrial Co., Ltd., Japan

[21] Appl. No.: 876,199

[22] Filed: Jun. 19, 1986

[30] Foreign Application Priority Data

Jun. 19, 1985 [JP] Japan ................................ 60-133263

[51] Int. Cl.<sup>4</sup> ........................................... G07G 1/12
[52] U.S. Cl. .................... 364/405; 340/721; 340/800
[58] Field of Search ............... 364/405, 401; 340/721, 340/800

[56] References Cited

U.S. PATENT DOCUMENTS

| | | | |
|---|---|---|---|
| 3,946,220 | 3/1976 | Brobeck | 364/405 |
| 4,360,872 | 11/1987 | Suzuki | 364/405 |
| 4,388,689 | 6/1983 | Hayman | 364/401 |
| 4,398,250 | 8/1983 | Hosono | 364/900 X |
| 4,553,222 | 11/1985 | Kurland | 364/900 |

*Primary Examiner*—Jerry Smith
*Assistant Examiner*—Steven G. Kibby
*Attorney, Agent, or Firm*—Lowe, Price, LeBlanc, Becker & Shur

[57] ABSTRACT

A first cash register operating in a registration mode is connected by a communication line to a second cash register operating in a calculation mode to serve customers forming a waiting line extending from the first cash register to the second. Sales data are registered by the first cash register, with the data of an earliest one of the customers being displayed on a first display unit and the sales data of all the customers being stored sequentially into respective second storage areas when a communication line is busy. When the line becomes available, the sales data are transmitted to the second cash register from the second storage areas sequentially. The second cash register stores the transmitted sales data into third and fourth storage areas in succession and provides a simultaneous display of the sales data stored in the fourth storage areas on respective window areas of a second display unit. An adder sequentially calculates the sales data stored in the fourth storage areas in response to operation of a control key. Each cash register is operable independently in the registration and calculation modes.

5 Claims, 5 Drawing Sheets

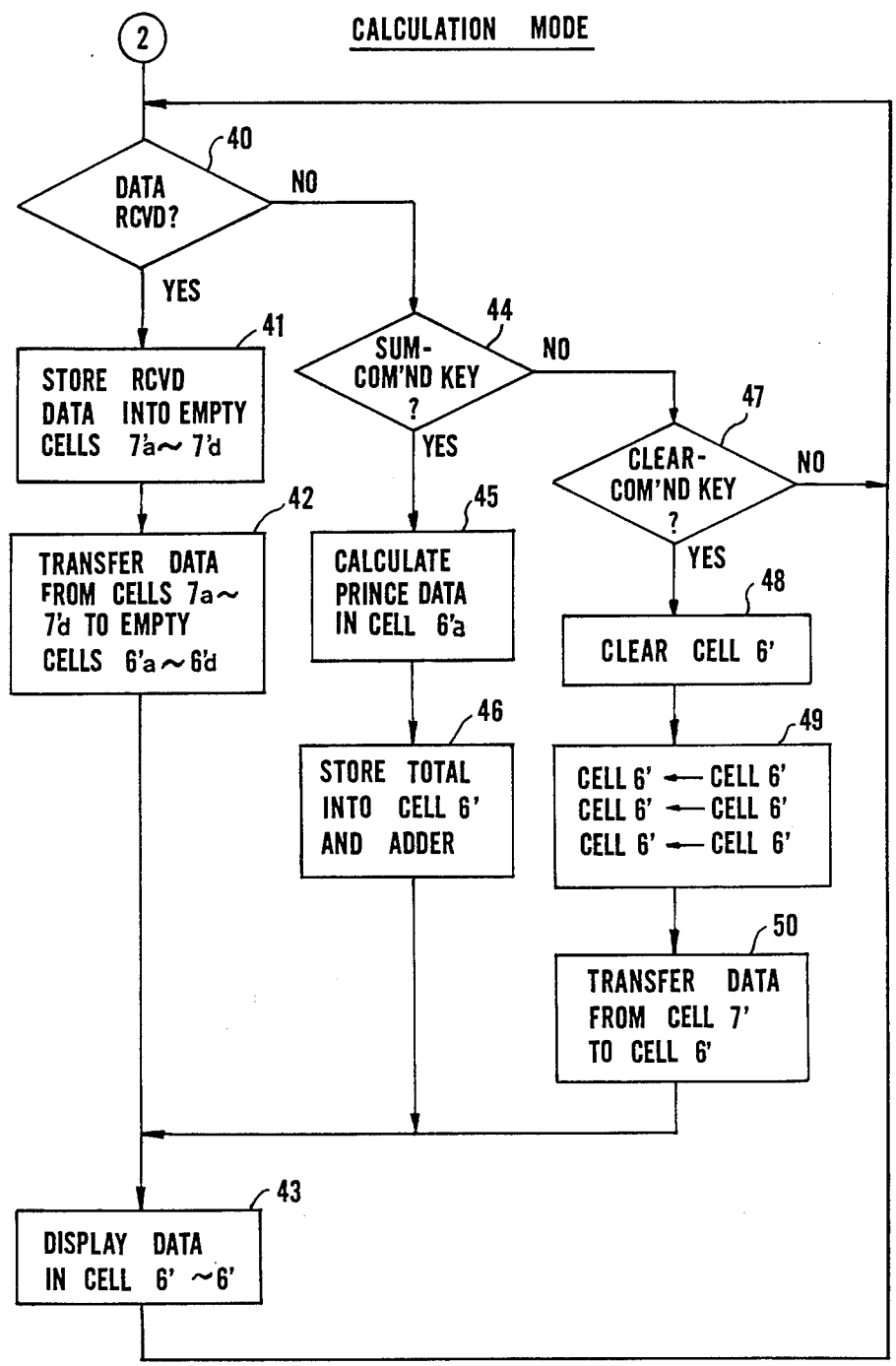

FIG. 3

KEYS OPERATED

CUSTOMER NO. 1

| HAMBURGER |
| JUICE |
| 500 CASH |

CUSTOMER NO. 2

| TOAST |
| COFFEE |
| 320 CASH |

CUSTOMER NO. 3

| 2 MILK |
| 2 TOAST |
| 400 CASH |

SALES DATA DISPLAYED ON CRT

4a (Customer 1):
```
<#01>
1 HAMBURGER 150
1 JUICE       50
       TOTL  200
       CASH  500
       CHNG  300
```

4a (Customer 2):
```
<#02>
1 TOAST      120
1 COFFEE     200
       TOTL  320
       CASH  320
       CHNG    0
```

4b (Customer 2):
```
<#01>
1 HAMBURGER 150
1 JUICE       50
       TOTL  200
       CASH  500
       CHNG  300
```

4a (Customer 3):
```
<#03>
2 MILK       100
2 TOAST      240
       TOTL  340
       CASH  400
       CHNG   60
```

4b (Customer 3):
```
<#02>
1 TOAST      120
1 COFFEE     200
       TOTL  320
       CASH  320
       CHNG    0
```

4c (Customer 3):
```
<#01>
1 HAMBURGER 150
1 JUICE       50
       TOTL  200
       CASH  500
       CHNG  300
```

CASH REGISTER WITH A MULTI-WINDOW DISPLAY

BACKGROUND OF THE INVENTION

The present invention relates generally to cash registers, and more specifically it relates to a cash register which permits sales persons to serve a rush of orders in an efficient manner.

Conventional cash registers employed in supermarkets or the like are specifically designed to provide totals of registered sales items, count change and generate a sales report for analysis of sales products.

However, since the conventional cash register is not capable of simultaneously displaying all sales items ordered by a customer, it is not suitable for fast-food shops where there is a rush of orders at specific periods of the day.

SUMMARY OF THE INVENTION

Accordingly, an object of the present invention is to provide a cash register having a multi-window display which displays sales items of a plurality of waiting customers on respective display windows to permit a sales person or persons to serve the customers in succession in an efficient manner. This object is achieved by the provision of memory cells corresponding to a predetermined number of waiting customers and like numbers of display windows. Sales data of each customer are stored into a corresponding one of the memory cells and calculation is performed on data stored in each memory cell. Sales data are shifted from one memory cell to the next to register sales data of a new customer and put on display in the corresponding display windows.

Another object of the present invention is to provide a cash register having the capability to operate singly in a registration-and-calculation (dual) mode and to operate interactively with another cash register in a registration-or-calculation (communication) mode through a communication line. This is achieved by the provision of a number of first memory cells corresponding to a predetermined number of waiting customers and like numbers of second memory cells which are connected to the second memory cells of another cash register through the communication line. During a dual mode operation, the first memory cells are utilized for storage of sales data and calculation is performed on the stored data to rewrite the stored data for display. During a communication mode, the cash register is switched to either registration mode or calculation mode. If the register is switched to the registration mode, another cash register is switched to the calculation mode. The first memory cells of the registration-mode cash register are used to store sales data for registration and display and the second memory cells of that cash register are used for data transfer to the second memory cells of the calculation-mode cash register to permit the first memory cells of the calculation-mode cash register to be used for calculation and display.

BRIEF DESCRIPTION OF THE DRAWINGS

The present invention will be described in further detail with reference to the accompanying drawings, in which:

FIGS. 2A, 2B and 2C are flowcharts describing the instructions according to which the controllers of FIG. 1 are programmed to perform; and FIG. 3 is a schematic illustration of simultaneously displayed sales data for plural customers.

DETAILED DESCRIPTION

Figure 1:
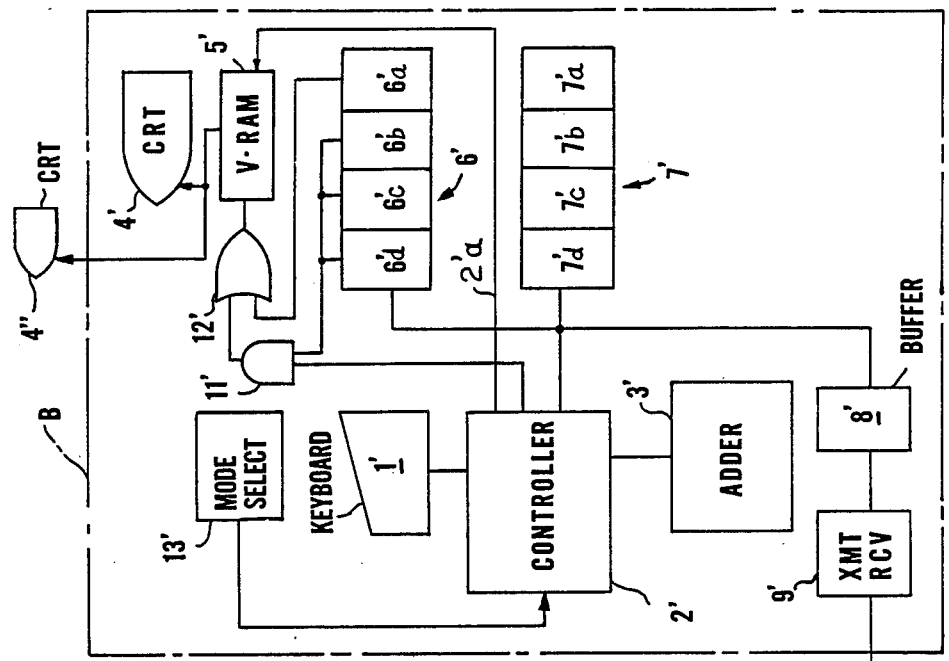
FIG. 1 is a block diagram of a system of cash registers according to an embodiment of the present invention.
Figure 1:
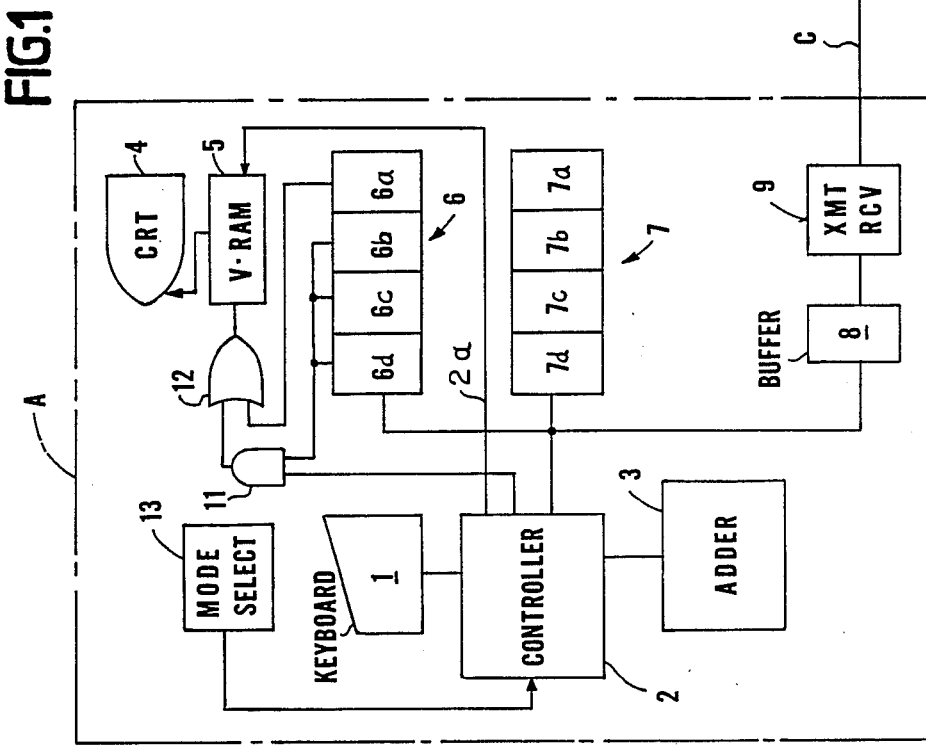

Referring to FIG. 1, there is shown a system of cash registers according to one embodiment of the present invention. The system comprises a first cash register A and a second cash register B interconnected by a communication line C. Cash registers A and B are constructed of identical circuit components including controllers 2 and 2', or microprocessors which are programmed to operate the individual cash registers A and B according to mode selectors 13 and 13' in a communication mode in which the cash registers perform registration and calculation functions, respectively, and in an independent mode in which they perform dual functions of registration and calculation independently of each other.

Cash registers A and B respectively comprise keyboards 1, 1', adders 3, 3', cathode ray tube displays 4, 4', conventional video circuits including video RAMs (random access memories) 5, 5', display memories 6, 6', buffer memories 7, 7' and character generators (not shown), line buffers 8, 8' and transmit-receive circuits 9, 9'. Display memory 6 comprises a set of memory cells 6a, 6b, 6c and 6d and buffer memory 7 has a corresponding number of memory cells 7a, 7b, 7c and 7d. Sales data of different customers are stored sequentially into memory cells 6a, 6b, 6c and 6d. The output of memory cell 6a is connected through an OR gate 12 to the input of video RAM 5 and the outputs of the other cells of memory 6 are multiplied to one input of an AND gate 11 which is enabled by controller 2, the output of AND gate 11 being coupled through the OR gate 12 to video RAM 5. In each cash register, controller 2 receives sales item data from the keyboard 1 and controls the transfer of data between memories 6 and 7 and stores data into adder 3.

When the cash registers A and B are operating in an independent mode, the buffer memories 7, 7', buffers 8, 8' and transmit-receive circuits 9, 9' are not used and provide registration and calculation functions using the other circuit components on an individual basis.

As in conventional cash registers, each of the keyboards 1, 1' comprises a plurality of sales item keys for registration of sales items, ten numeric keys for the registration of the quantity of sales items and their unit prices, an end-of-items key which indicates the end of sales items for a given customer, a sum command key for instructing the controller to provide summation of the prices of the registered items of the given customer, and a clear command key for clearing the registered and summed data.

Figure 2A:
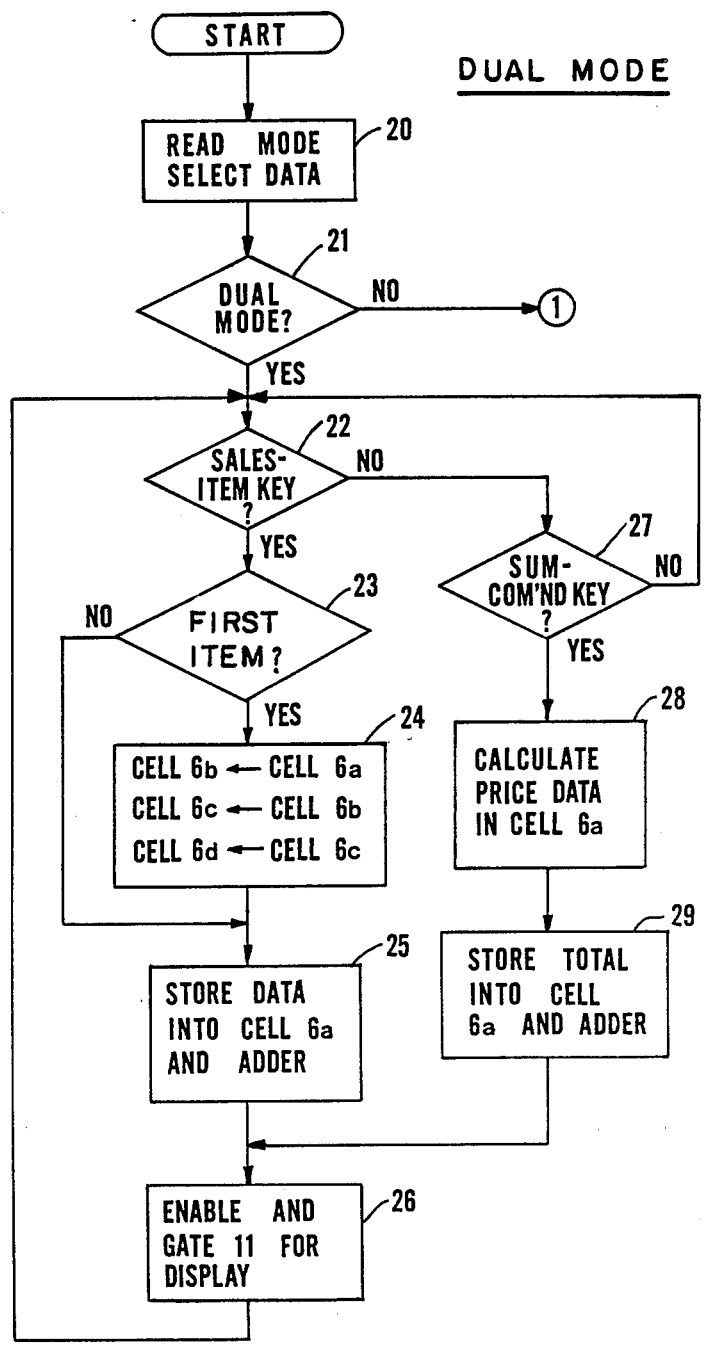
Figure 2B:
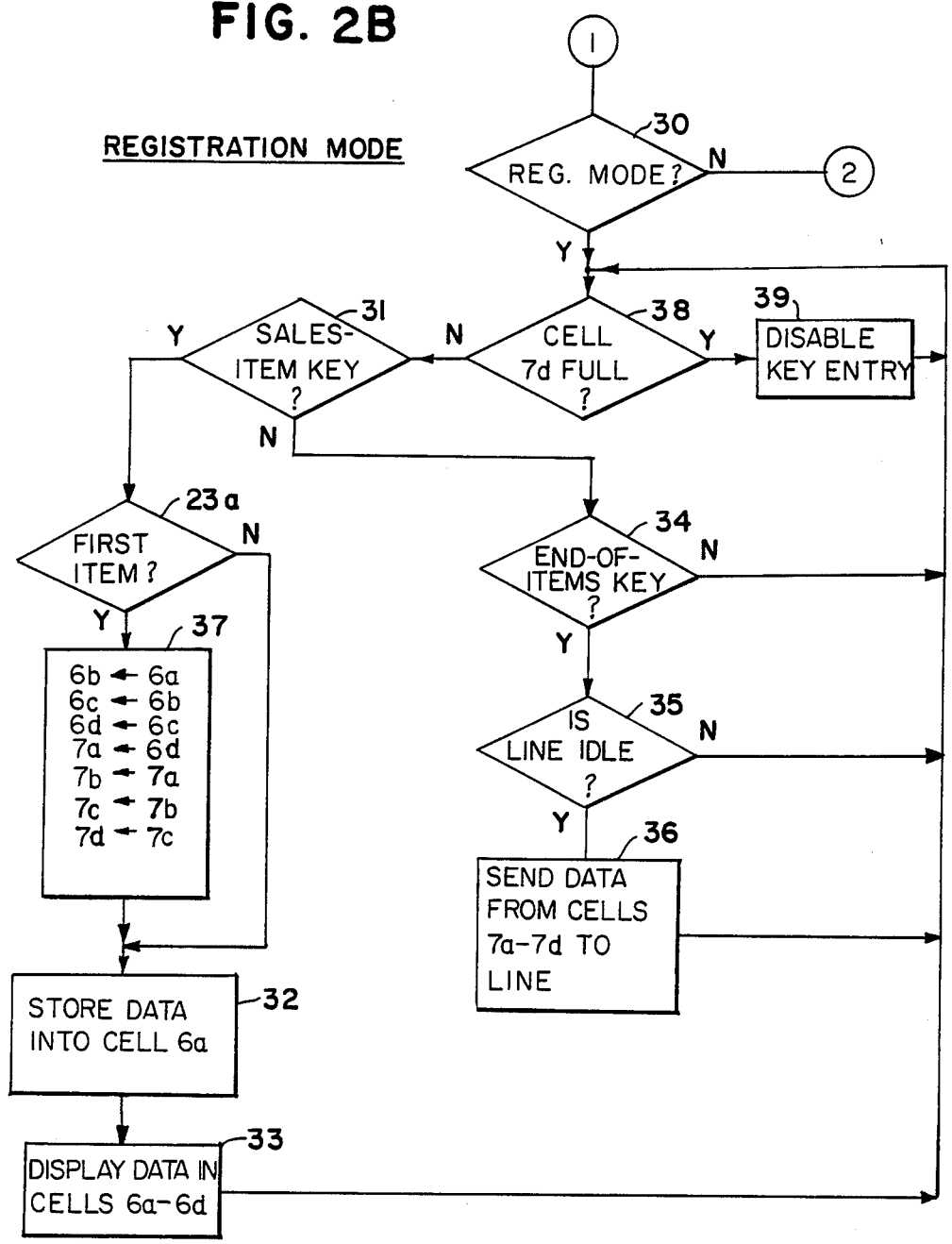

The operation of the controllers 2, 2' will be understood with reference to flowcharts shown in FIGS. 2A, 2B and 2C. The program begins with operations block 20 which directs the reading of a mode select signal supplied from mode selectors 13, 13' and calls for an exit to decision block 21 which tests for the presence of a dual mode select signal. If there is one, exit is to decision block 22 to permit the cash registers to operate independently in a dual mode. If there is none, exit is to decision block 30 which tests for the presence of a registration mode signal. If there is one, exit is to operations block 31 to cause the cash registers to operate in a registration mode, and if there is none, control proceeds to operations block 40 which causes the cash registers to operate in a calculation mode.

Assume that cash registers A and B individually operate in a dual mode. Exit from decision block 21 is to decision block 22 which checks for the operation of a sales-item key.

If there is none, exit is to decision block 27 which checks to see if the sum-command key is operated. If not, control returns to block 22, so that when the sales-item key is not operated during successive registrations of sales items, the control operation loops blocks 22 and 27. When the sales-item key is operated, decision at block 22 yields an affirmative answer and control advances to decision block 23 which checks to see if the operation of the sales-item key is in response to the entry of a first sales item of a given waiting customer. If it is, control proceeds to operations block 24 which directs the shifting of sales data from memory cells 6a, 6b, 6c to cells 6b, 6c, 6d, respectively, so that cell 6a is emptied to store sales data of the given customer. Exit then is to operations block 25 which directs the writing of first item data containing a sales-item identification code and a quantity code into memory cell 6a and adder 3. Control proceeds to operations block 26 which enables AND gate 11 to pass sales data from cells 6a, 6b, 6c and 6d to video RAM 5 to provide a display on the screen of CRT 4. Control now returns to decision block 22. If there is more than one sales item in the shopping list, the sales-item key will be operated again to register a second sales item. Therefore, exit from decision block 22 is to block 23 in which the answer is negative for an exit to operations block 25. The second sales data is stored into cell 6a in addition to the first sales data and displayed. The above process is repeated to store the list of sales items of a waiting customer into cell 6a. Following the display of all the sales items of the waiting customer, the sales-item key is not operated and so execution of decision block 22 yields a negative answer to allow control to exit to decision block 27 which checks to see if the sum command key is operated.

When all the sales items of the given customer have been registered, the sum-command is operated, yielding an affirmative answer in decision block 27. Exit is to operations block 28 which directs the summation of prices of the sales items registered into cell 6a and the subtraction of the total price from the value of cash received from the waiting customer to calculate the change. Exit then is to operations block 29 which directs the storing of the total and change data into cell 6a and adder 3. Control now advances to display routine 26 which directs the display of data including sales items, individual prices, total price, the amount of cash received and the amount of change to be paid in a manner described hereinbelow.

Video RAM 5 is divided into four equal storage areas which are respectively addressed in response to address data supplied from the controller 2 on an address bus 2a and the video screen of the cathode ray tube 5 is correspondingly divided into four equal window areas 4a, 4b, 4c and 4d as illustrated in FIG. 3. The enablement of AND gate 11 in operations block 26 causes sales data stored in cells 6b to 6d to be displayed on window areas 4b, 4c and 4d as well as the sales data stored in cell 6a on area 4a. For example, if a first customer placed an order for one piece of hamburger and a bottle of beverage in a fast-food shop, data indicating quantities, sales-item names, total price and change are fed from memory cell 6a to the corresponding storage area of RAM 5 and individual price data are supplied from controller 2 to the corresponding storage area of RAM 5 and displayed on window 4a of the CRT screen as indicated at the top of FIG. 3.

Viewing the sales data displayed on window 4a, a second sales person of the shop prepares the registered sales items in required quantities for the first customer, while the first sales person shifts his or her attention to a second customer. When the sales items and quantities of the second customer are registered, the sales data of the cell 6a is shifted to cell 6b by the execution of block 24 to permit the sales data of the second customer to be stored into the emptied cell 6a as well as into adder 3, so that sales data of the first and second customers are displayed on windows 4b and 4a side by side as indicated in the middle of FIG. 3. Likewise, registration and calculation of an order from a third customer causes the sales data of the first and second customers to be shifted to cells 6c and 6b respectively and the sales data of the third customer is stored in cell 6a, and all the sales data of the first to third customers are displayed on windows 4c, 4b and 4a, respectively, upon the completion of calculations for the third customer, as indicated on the bottom of FIG. 3. This allows third and fourth sales persons of the shop to participate in the preparation of the sequentially ordered sales items while viewing the display 4, while allowing the sales person in charge of the registration of customer's orders to concentrate his or her attention to the assigned job.

Thus, the dual mode of operation allows a single cash register to be operated in registration and calculation modes in sequence. This is suitable for small-sized shops. A plurality of dual mode cash registers can also work individually in large-sized shops during off-peak periods. The mode of operation can be changed to a communication mode in which the cash registers cooperate with each other during peak periods through communication line C. In this mode, the mode selector 13 of first cash register A generates a registration-mode signal and the selector 13' generates a calculation-mode signal.

In the communication mode, the controller 1 of the first cash register A starts operating with operations block 20, FIG. 2A, as in the dual mode. Control passes through decision block 21 to decision block 30 of FIG. 2B (registration mode) to check to see if the registration mode is selected. If it is, exit is to decision block 38 which tests to see if cell 7d is full. If the answer is affirmative, exit is to operations block 39 which directs the disabling of key entry. If the answer is negative in block 38, control exits to decision block 31 to check to see if the sales-item key is operated. If it is, exit is to decision block 23a identical to decision block 23 of FIG. 2A to check to see if the sales-item key has been operated in response to the entry of a first sales item of a given customer. If the answer is affirmative, exit then is to operations block 37 similar to block 24 of FIG. 2A to direct the shifting of data from cells 6a, 6b, 6c to cells 6b, 6c, 6d and shifting of data from cells 6d, 7a, 7b, 7c to cells 7a, 7b, 7c, 7d, respectively, to empty the cell 6a and save data in cells 6a through 6d successively into cells 7a through 7d. Following the execution of block 37, control exits to operations block 32 which directs the storing of sales data into cell 6a. Control then goes to operations block 33 which directs the displaying of data in cells 6a through 6d on the display 4. Control now returns to block 38 to repeat the above process. Thus, the next operation of sales-item key of the given customer allows control to bypass operations block 37 to store sales data of successive items of that given customer into cell 6a.

If the answer in decision block 31 is negative, control exists to decision block 34 which checks for the operation of the end-of-items key which occurs at the end of order of each customer. If there is one, exit is to decision block 35 which tests for the presence of an idle state in the communication line C. If the answer is affirmative, control advances to operations block 36 which directs the sending of sales data from cells 7a, 7b, 7c and 7d to communication line C and control returns to block 38. If the end-of-items key is not operated or the communication line is not idle, control returns to block 38 to repeat the process.

Therefore, the sales data of ordered items are registered and displayed by cash register A, leaving the necessary calculations to be performed by cash register B. Sequentially arriving customers will stand in a waiting line extending from the first cash register A to the second cash register B where the ordered items are prepared and handed to the waiting customers.

The operation of controller 2' of the second cash register B starts with operations block 20, FIG. 2A in a manner similar to the operation of the controllers described previously. Control passes through decision blocks 21 and 30 to decision block 40, FIG. 2C, which checks for the presence of sales data in the buffer 8'. If the answer is affirmative, exit is to operations block 41 which directs the storing of the received sales data into empty buffer memory cells 7'a through 7'd. Exit then is to operations block 42 which directs the transfer of sales data from buffer cells 7'a through 7'd to display cells 6'a through 6'd, respectively. Control then proceeds to operations block 43 which directs the display of data now stored in cells 6'a through 6'd. Control now returns to decision block 40. Upon arrival of sales data from cash register A, the controller 2' executes operations blocks 41, 42 and 43 to update the displayed data.

If the answer in block 40 is negative, exit is to decision block 44 which tests for the presence of sum-command key operation. If there is one, exit is to operations block 45 which directs the summing of price data stored in cell 6'a. Control goes to operations block 46 which directs the storing of the summed price data into cell 6'a and adder 3'. Operations block 43 is again executed to update the displayed sales data. Therefore, the sales persons at the second cash register B concentrate their attentions to the preparation of registered items while viewing the display by operating the sum-command key for each waiting customer.

If there is no sum-command key operation, exit from decision block 44 is to decision block 47 which tests for the presence of clear-command key operation. If there is one, exit is to operations block 48 which directs the clearing of cell 6'a. Exit then is to operations block 49 which directs the transfer of sales data from cells 6'b, 6'c, 6'd to adjacent cells 6'a, 6'b, 6'c, respectively. Control then exits to operations block 50 which directs the transfer of the contents of cell 7'a to cell 6'd. Since the contents of buffer memory cells 7'a through 7'd are constantly loaded with incoming sales data, the display cell 6'd is loaded with sales data of the latest arrival. Control exits from block 50 to block 43 to update the displayed data.

It is seen from the foregoing that the visual indication of sales data for plural waiting customers permits sales persons to respectively attend to different customers at the same time. Thus, the invention permits sales persons to efficiently attend to a rush of orders. Furthermore, the variable mode feature of the invention permits the cash register to fit to any size of shop.

During the registration mode, it may be advantageous to provide an additional cathode ray tube 4" as shown in FIG. 1. Cathode ray tube 4" is multiplied to the cathode ray tube 4' to provide the same display at a location remote from the cash register B to allow another sales person to cooperate with the sales persons at the cash register B.

What is claimed is:

1. A cash register comprising:
   a keyboard having a plurality of sales item keys for generating sales data for each of a plurality of customers and a plurality of control keys;
   memory means having a plurality of storage areas corresponding respectively to said customers;
   calculating means;
   a controller means for addressing said storage areas to store said sales data of said customers into said storage areas and causing said calculating means to calculate the sales data stored in each of said storage areas in response to operation of one of said control keys; and
   display means having a plurality of display windows respectively corresponding to said storage areas and connected to said controller means for displaying in the corresponding display windows a plurality of sales data stored in said storage areas and a plurality of data resulting from the calculation by said calculating means.

2. A cash register comprising:
   a keyboard having a plurality of sales item keys for generating sales data for each of a plurality of customers and a plurality of control keys;
   memory means having a plurality of first storage areas corresponding respectively to said customers and a plurality of second storage areas corresponding respectively to said customers;
   mode setting means for selectively establishing registration and calculation modes of operation;
   calculating means;
   a controller means responsive to said registration mode for storing said sales data of said customers into said first and second storage areas and for transmitting sales data from said second storage areas to a communication line when said line is available,
   said controller means responsive to said calculation mode for storing said sales data of said customers into said second storage areas in succession, for transferring the sales data to said first storage areas, and for causing said calculating means to calculate the sales data stored in said first storage areas in response to operation of one of said control keys and rewriting said first storage areas with the calculated sales data; and
   display means having a plurality of display windows corresponding respectively to said first storage areas and responsive to said registration mode for displaying the sales data stored in one of said first storage areas and responsive to said calculation mode for displaying the sales data stored in said first storage areas in said display windows.

3. A cash register as claimed in claim 2, wherein said mode setting means further establishes a dual mode of operations, wherein said controller means is responsive to said dual mode for storing said sales data into said first storage areas so that the sales data of a plurality of customers are stored respectively in said first storage areas and causing said calculating means to calculate the sales data stored in said first storage areas in response to operation of said control key, and wherein said display means is responsive to said dual mode for displaying the sales data stored in said first storage areas in said display windows.

4. A system of cash registers interconnected by a communication line, comprising:
   a first cash register comprising:
   a first keyboard having a plurality of sales item keys for generating sales data for each of a plurality of customers;
   first memory means having a plurality of first storage areas corresponding respectively to said customers and a plurality of second storage areas corresponding respectively to said customers;
   first controller means for storing said sales data into said first and second storage areas and for transmitting sales data from said second storage areas to said communication line when the line is available;
   a first display unit for displaying the sales data stored in said first storage areas, and
   a second cash register comprising:
   a second keyboard having a plurality of second control keys;
   second memory means having a plurality of third storage areas corresponding respectively to said customers and a plurality of fourth storage areas corresponding respectively to said customers;
   calculating means;
   second controller means for storing the sales data transmitted from said first cash register into said third and fourth storage areas in succession and for causing said calculating means to calculate the sales data stored in said fourth storage areas in response to operation of one of said second control keys and rewriting said fourth storage areas with the calculated sales data; and
   a second display unit having a plurality of display windows corresponding respectively to said fourth storage areas for displaying the sales data of said fourth storage areas in said display windows.

5. A system as claimed in claim 4, further comprising a third display unit multiplied to said second display unit, said third display unit being located remote from the location of said second display unit.

* * * * *